(No Model.)
J. BEAULIEU.
MEAT HANGER.
No. 584,978. Patented June 22, 1897.
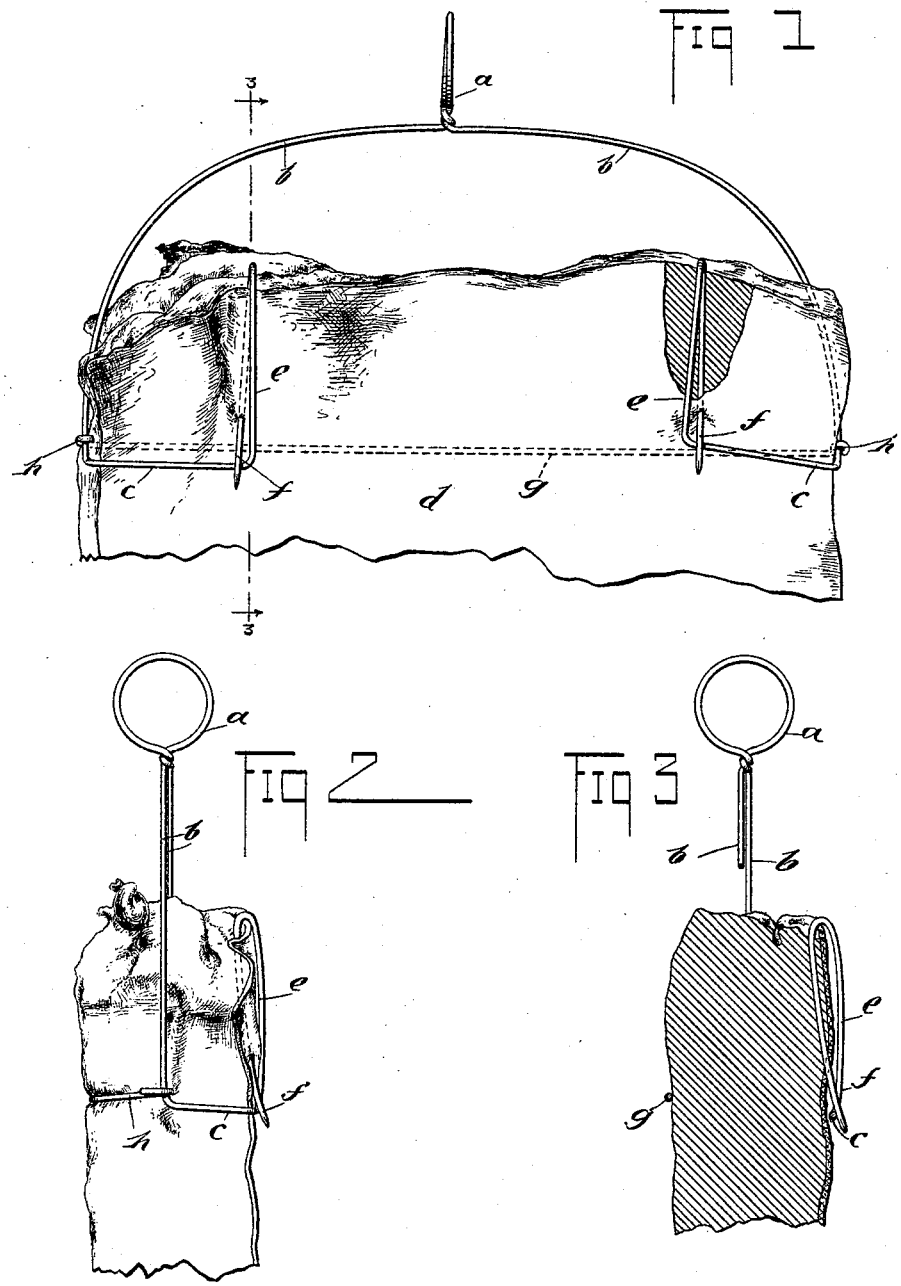
WITNESSES
INVENTOR
J. Beaulieu.
BY
ATTORNEYS.

UNITED STATES PATENT OFFICE.

JOSEPH BEAULIEU, OF HOT SPRINGS, ARKANSAS, ASSIGNOR TO HIMSELF, JACOB MILLER, AND OMER L'HUILBRY, OF SAME PLACE.

MEAT-HANGER.

SPECIFICATION forming part of Letters Patent No. 584,978, dated June 22, 1897.

Application filed March 1, 1897. Serial No. 625,500. (No model.)

*To all whom it may concern:*

Be it known that I, JOSEPH BEAULIEU, of Hot Springs, in the county of Garland and State of Arkansas, have invented a new and Improved Meat-Hanger, of which the following is a full, clear, and exact description.

The purpose of this invention is to provide superior means for hanging bacon and other meats when the same are being cured, and also for holding the meats when portions are being cut therefrom.

The invention is particularly adapted for hanging bacon, which it serves to hold without mutilating the meat and without preventing the body of the meat from being sliced uniformly.

The invention will be fully described hereinafter, and defined in the claims.

Reference is to be had to the accompanying drawings, forming a part of this specification, in which similar characters of reference indicate corresponding parts in all the figures.

Figure 1 is a side elevation of the invention, showing it in use. Fig. 2 is an end elevation thereof, and Fig. 3 is a sectional view on the line 3 3 of Fig. 1.

The hanger is formed of two sections of steel or other wire. The main section has its middle portion provided with a loop $a$, and from the loop the runs $b$ of the main section extend oppositely outward and downward. The lower portions of the runs $b$ are each bent forward and thence inward to form angular portions $c$, respectively, embracing corners of the meat $d$. From the inner ends of the angular portions $c$ the wire composing the main section of the hanger extends upward and thence downward to form a loop $e$, one side of each of which is formed by the respective terminals of the wire, which are pointed to produce pins $f$, projecting slightly below the angular portions $c$ and capable of being bent around the outer sides of the respective angular portions, so as to be secured in place, as the drawings show.

The auxiliary section of the hanger consists in a length of wire the middle portion $g$ of which is adapted to run along the side of the meat opposite the side on which the loops $e$ are located. The terminals $h$ of the auxiliary section are respectively bent forward and secured to the lower extremities of the respective runs $b$. This construction clamps the meat between the angular portions $c$ of the main section and the intermediate portion $g$ of the auxiliary section, which, together with the engagement of the pins $f$ with the meat, serves to prevent the meat from being displaced.

The invention is particularly adapted to hanging bacon, such as is cut in long slender slices. Such bacon has at one side a heavy skin, with which the pins $f$ are engaged. This holds the bacon immovably in the hanger and at the same time does not mutilate the body of the meat, thus allowing the entire piece of meat to be cut into slices, which would not be possible were the meat pierced entirely through for the reception of a string or similar device. The points of the pins $f$ may be cut off after the hanger has been secured to the meat, which will prevent the points from projecting to injure persons handling the meat and also will destroy the hanger and prevent it from being used again, it being intended that a new hanger shall be used for every piece of meat.

The hanger may be enlarged or contracted to suit the size of the meat to be hung.

It is preferable to construct the hanger of non-corrosive material.

Having thus described my invention, I claim as new and desire to secure by Letters Patent—

1. A meat-hanger having main and auxiliary sections, the main section having an intermediate loop and having two runs passed oppositely from the loop, each run having a forwardly and inwardly bent angular portion at its lower end, and each angular portion having at its inner end a loop, one side of which is free and forms a pin capable of being engaged with the inner ends of the respective angular portions, and the auxiliary section having an intermediate portion, and having terminals bent forwardly and respectively joined to the lower ends of the runs which pass from the loop of the main section, substantially as described.

2. A meat-hanger having main and auxiliary sections, the main section having two angular portions rigidly joined to each other, and each angular portion having at its inner end an upwardly-extending loop one side of which is free and forms a pin capable of engaging the meat, and the auxiliary section having an intermediate portion capable of engaging the meat at the side opposite to the pin, and having terminals extended forwardly and respectively engaged with the main section, substantially as described.

3. A meat-hanger having two sections, one section having a loop one side of which is free and forms a pin capable of engaging with the meat, and the second section being capable of being joined to the first section to hold the meat between the two sections, substantially as described.

4. A meat-hanger having two sections capable of being joined to each other and of holding the meat between them, one section having a pin adapted to engage the meat, substantially as described.

5. A meat-hanger having two sections adapted to hold the meat between them, one of the sections having a loop one side of which is free and pointed to form a pin adapted to engage the meat, substantially as described.

6. A meat-hanger formed of two sections adapted to have the meat held between them, one of the sections being formed of wire and having one terminal of the material forming the said section bent to produce a loop, one side of the loop being free and pointed to form a pin capable of engaging the meat to hold the same, substantially as described.

JOSEPH BEAULIEU.

Witnesses:
LYMAN T. HAY,
M. DOUD.